United States Patent [19]

Sundstrom et al.

[11] 4,337,655
[45] Jul. 6, 1982

[54] VALVE PROVIDED WITH A MEASURING INSTRUMENT AND INTENDED FOR A MOVING MEDIUM

[76] Inventors: Inge B. Sundstrom, Ekebergabacken 86, Farsta; Per R. W. Cairenius, Braxstigen 7, Tyreso, both of Sweden

[21] Appl. No.: 191,442

[22] Filed: Sep. 29, 1980

Related U.S. Application Data

[63] Continuation-in-part of Ser. No. 59,389, Jul. 20, 1979, abandoned, which is a continuation of Ser. No. 828,668, Aug. 29, 1977, abandoned.

[30] Foreign Application Priority Data

Sep. 9, 1976 [SE] Sweden .................................. 7610764

[51] Int. Cl.³ .................... G01F 1/115; G01K 17/00
[52] U.S. Cl. ............................. 73/193 R; 73/861.77; 73/198
[58] Field of Search ........... 73/861.77, 861.78, 193 R, 73/198, 273

[56] References Cited

U.S. PATENT DOCUMENTS

| | | | |
|---|---|---|---|
| 1,152,952 | 9/1915 | Kepa | 73/861.33 |
| 3,452,593 | 7/1969 | Lauter, Jr. | 73/861.77 |
| 3,617,713 | 11/1971 | Karlson | 73/193 R |
| 3,636,767 | 1/1972 | Duffy | 73/861.78 |
| 3,729,996 | 5/1973 | Metz | 73/861.77 |
| 3,795,144 | 3/1974 | Marchesi | 73/275 |
| 4,048,852 | 9/1977 | Sanakibara et al. | 73/193 R |
| 4,250,747 | 2/1981 | Diprose et al. | 73/193 R |

*Primary Examiner*—Herbert Goldstein
*Attorney, Agent, or Firm*—Larson & Taylor

[57] ABSTRACT

A valve unit for a flowing medium is combined with an electrical measuring system to provide measurement of the rate of flow of the medium. The valve unit is connected to a propeller-type rotor disposed in a conduit which communicates with the valve. The rotor incorporates a permanent magnet in at least one vane thereof and the measuring system includes a magnetic pulse generator which senses the magnetic field produced by the magnet and generates a corresponding train of pulses during the rotation of the rotor. An amplifier-differentiator connected to the pulse generator produces an output in accordance with the derivative of the pulses so as to provide an indication of the rate of flow.

8 Claims, 4 Drawing Figures

VALVE PROVIDED WITH A MEASURING INSTRUMENT AND INTENDED FOR A MOVING MEDIUM

CROSS-REFERENCE TO RELATED APPLICATIONS

This application is a continuation-in-part of applicant's copending application, Ser. No. 059,389, filed July 20, 1979 now abandoned, which is a continuation of application Ser. No. 828,668, filed Aug. 29, 1977, and now abandoned.

BACKGROUND

In systems comprising a moving medium, it is desirable to quickly and effectively adjust a control valve in such a way that the moving medium gets a given value, independently of the speed of movement, representing heat per unit of time of the moving medium or any other characteristic. A typical example where there is need for such a device is a system for heating buildings by means of heat radiators from a common feeder conduit. A valve is connected into the common feeder conduit, and this will thereafter, dependent upon the need for the moving medium or the content of heat carried up by said medium, be set into a position corresponding to the circumstances, e.g. dependent upon the outside air temperature, the speed of the wind or other characteristics determining the function of a climatization system.

Hitherto this problem has been solved by a conduit, e.g. a flexible tube, being connected on each side of the restriction, presented by the valve, with the other end of said conduits being connected to each end of a U-shaped tube of barometric type. Then one could read the difference in altitude between the medium columns in the two shanks of said U-tube, and this difference formed a measure for the pressure drop of the moving medium during its movement through the valve. The intention was to guide one to set the valve in the desired position. Such an arrangement, however, has not been satisfactory for several different reasons.

In a system of this kind, it is not desired to know the pressure drop across the valve but rather other parameters, which are in a given relationship to said pressure drop, for instance the speed of movement expressed in liters per minute. One could only get this kind of information after making a comprehensive calculation, which could perhaps take place in a graphical way. Further, the relationship between the pressure drop and the speed of movement is not linear but varies according to a complicated rule, and secondly this relation also has the property of being dependent upon the mechanical dimensions of the system, e.g. the magnitude of the valve, a smaller valve causes a high pressure drop corresponding to a given movement, whereas the same pressure drop in a larger valve corresponds to a much greater movement. In addition, the relation is not only dependent upon each existing valve but will also vary in part with the pump pressure created in the system, and in part with the flow resistance in the earlier or subsequent parts of the conduits.

The consequence has been that adjustment in the above mentioned way, known per se, required a reading of the pressure drop, a subsequent mathematical or graphical counting operation, and thereafter a test adjustment of the valve. Then one must check to see if the valve position which was set is the correct position by a renewed reading of the pressure drop, a re-calculation thereof and so on, until one has by a trial and error operation achieved the correct valve of adjustment.

In practice, it has proved that these operations rather often have to be made by persons who are more or less uneducated, and they thereby have a need for a marking on the wheel of the valve in order to read the different positions. This, in turn, has required that the valve should be adjustable for movement between fully opened and fully closed within a single turn of the wheel. Such a valve has always had bad accuracy in adjusting flow.

The lack of accuracy in the adjustment of such a valve also prevents the possibility of making use of the advantage of shaping the valve body in a given way to cause a linear valve control or any other characteristic desired for one reason or another.

Therefore, it is obvious that all of these disadvantages may be eliminated, if one had available, in connection with the valve to be used for control purposes, an instrument, which would, independently of the magnitude of the valve and independently of the pressure in the existing pump arrangement and also independently of the resistance against movement in the preceding and following parts of the conduit system, indicate the magnitude of a desired parameter, e.g. the speed of movement or the quantity of heat transferred by the controlled medium per unit of time or the like.

SUMMARY OF THE INVENTION

The present invention refers to an arrangement of a valve for a moving medium provided with a measuring instrument, by which the disadvantages indicated above in the arrangements known in the art for the same purpose are avoided, and in addition thereto advantages are gained. An especially important advantage which should be mentioned is that one will get a direct indication of the controlled magnitude of the valve, during the running adjustment, thereby eliminating the need to mark the positions of the valve wheel. Some resulting advantages are that first the adjustment will be much easier, and that second the valve can be made for turning a plurality of turns between full opening and full closing with increased accuracy following therefrom and the possibility of giving the valve a given desired characteristic by shaping the valve body.

Another essential advantage of the invention is that, in a way which will be further explained below, the measuring takes place without any medium conductive conduits being connected between the valve and the measuring instrument. The leakage risk is thereby decreased. Also the measuring instrument, which will also be further explained below, is electronically controlled under signal amplification, allowing the mechanically moveable part of the measuring instrument to be completely contained within the conduit connected to the valve thereby subjecting it to a minimum of load. This also increases the accuracy of the measurement device.

According to the invention, the valve is connected to a propeller like rotor containing a permanent magnet and said rotor is totally contained within a conduit running to or from the valve and constructively forming part of the valve. Such built-in rotors were earlier known as machinery elements, for instance in loggs or the like. Outside of the valve at the location where the rotor is situated, a magnetic pulse generator is provided for creating electrical pulses in time with the movement of the permanent magnet in the rotor. Although such a magnetic pulse generator is known per se, it is not known in connection with such a valve. For amplification of these pulses, an instrument, belonging to the arrangement, is so arranged that the pulses will also be measured during predetermined differential time periods for indication of the speed of movement of the medium.

According to an especially important improvement of the invention, the amplifier and the differentiation arrangement may be connected to a multiplication device, the result of said measurement of the flow being connected to one side thereof and connected to the other side can be a signal relating to the temperature of the medium or of the difference of temperature between the moving medium and of some other part of the system, such as the ambient outside atmosphere.

The invention will be further described below in connection with the attached drawings which show several embodiments of the invention. However, it should be understood that the invention is not limited to these embodiments, but that all different modifications may exist within the framework of the invention.

BRIEF DESCRIPTION OF THE DRAWINGS

With reference to the drawings,

FIG. 1 shows in highly schematic form a first embodiment of the invention, in which only the movement of medium is measured, whereas

DETAILED DESCRIPTION OF PREFERRED EMBODIMENTS

Figure 1:
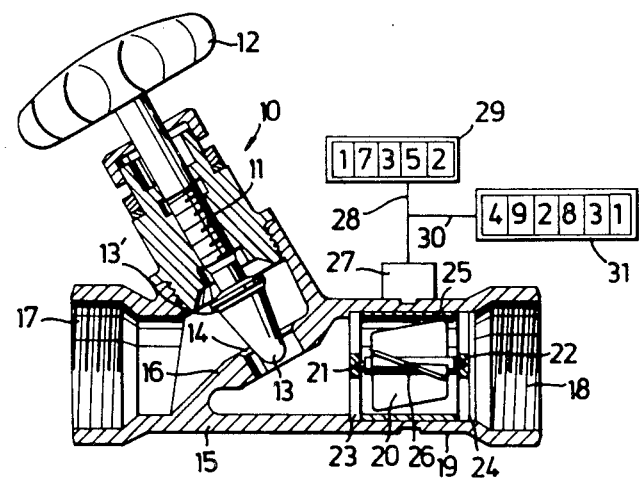

FIG. 1, a very simple arrangement according to the invention is shown in highly schematic form. The valve 10 in this arrangement is provided with a valve shaft 11, a valve wheel 12 and a valve body 13, the latter of which during the turning of the shaft 11 will be placed closer to or further away from a valve seat 14 in the form of an opening through a wall 16 which extends through the valve casing 15. The inlet to the valve 10 is preferably provided at its side, on the left in the drawing, by means of a conduit with connection bushing 17, whereas the outlet is provided at the conduit, on the right, by means of connection bushing 18. Although this deposition is not required, it is nevertheless preferable because the valve body 13 is, at its upper end, provided with a tightening ring 13' for contact with the upper edge of the valve seat 14, so that it is, for practical reasons, appropriate that the tightening ring faces the pressure side of the moving medium, whereas the valve seat 15 faces the other side. Valves of this type are, of course, known per se.

However, connected to the valve casing 15 there is a prolongation 19 provided between the valve 13, 14 proper, on the one side, and the connection bushing 18, on the other side. This prolongation 19, for practical reasons, has been arranged on the outlet side of the valve arrangement, but it could as well have been provided on the inlet side. Inside of this prolongation 19 there is a rotor 20, carried up by means of a couple of needle bearings 21, 22 disposed in cross arms 23 and 24, respectively. Preferably, the rotor 20 is arranged as a removable unit, and is built in into a tube formed part 25, so that this entire part may, if there should appear an error, by completely replaced. In the case shown, the rotor 20 has the shape of a propeller with four vanes or wings, arranged in screw form about the rotor shaft, but, of course, rotor 20 may also have another shape.

A permanent magnet 26 is built into the rotor 20, for instance as shown in FIG. 1, by being molded into two propeller wings opposite to each other, the latter being made from some non-magnetic material, for instance brass or plastic. In this connection, it should be mentioned that the valve casing 15 as well as the tube-formed part 25 are also made from some non-magnetic material. The reason for this is that one will not allow for any magnetic shunting of the magnetic field or flux to take place. The magnetic field is sensed by a magnetic pulse generator 27, in connection with the valve, said generator, in a manner known per se, creating a pulse in the conduit 28 for each turn of the rotor, provided that there is only one magnet. If more magnets of this type are used, of course, the pulse frequency will increase correspondingly. Magnet pulse generators of this type are known per se but is probable that they have not been used in connection with valves.

The conduit 28 is connected to an instrument along with the equipment belonging thereto, denoted 29, in which the pulse train from the magnet pulse generator 27 is measured with respect to a predetermined differential time period. By this, one will thus get an output related to the flow through the valve, which means the amount of the flowing medium per unit of time. There is nothing to prevent, of course, the pulse train from also being conducted through a branch 30 to a second pulse counting instrument 31, which will count and register a count corresponding to the total flow. Such a development of the arrangement according to the invention may be of great value, when the question is one about measuring the total power, e.g. heat power, or the total quantity of oil or the like, consumed by a consumer, but it is of subordinated importance regarding heating systems of the type initially mentioned, in which one, in the first place, will need to know the speed of the medium flow in order to adjust the valve 10, guided by such a statement to the desired volume.

The magnetic pulse generator 27 may be of any suitable type. The most simple form would be the one having a soft iron yoke surrounded by a magnetic winding, the terminals of which are connected to the conduit 28. However, the iron in such a magnet yoke has a given inertia and also hysteresis, causing so called hysteresis losses, which provide a load on the rotor. This load may cause a given error in the resultant indication and thereby lessen the accuracy. According to a further development of the invention, one prevents such errors in the output of the magnet pulse generator by providing one, or even two, magnet field sensitive or magnetostrictive resistors, with the resistors in the latter case being polarized in opposite directions. The arrangement of these resistors in a preferred embodiment of the invention will be seen in FIG. 2.

Figure 2:
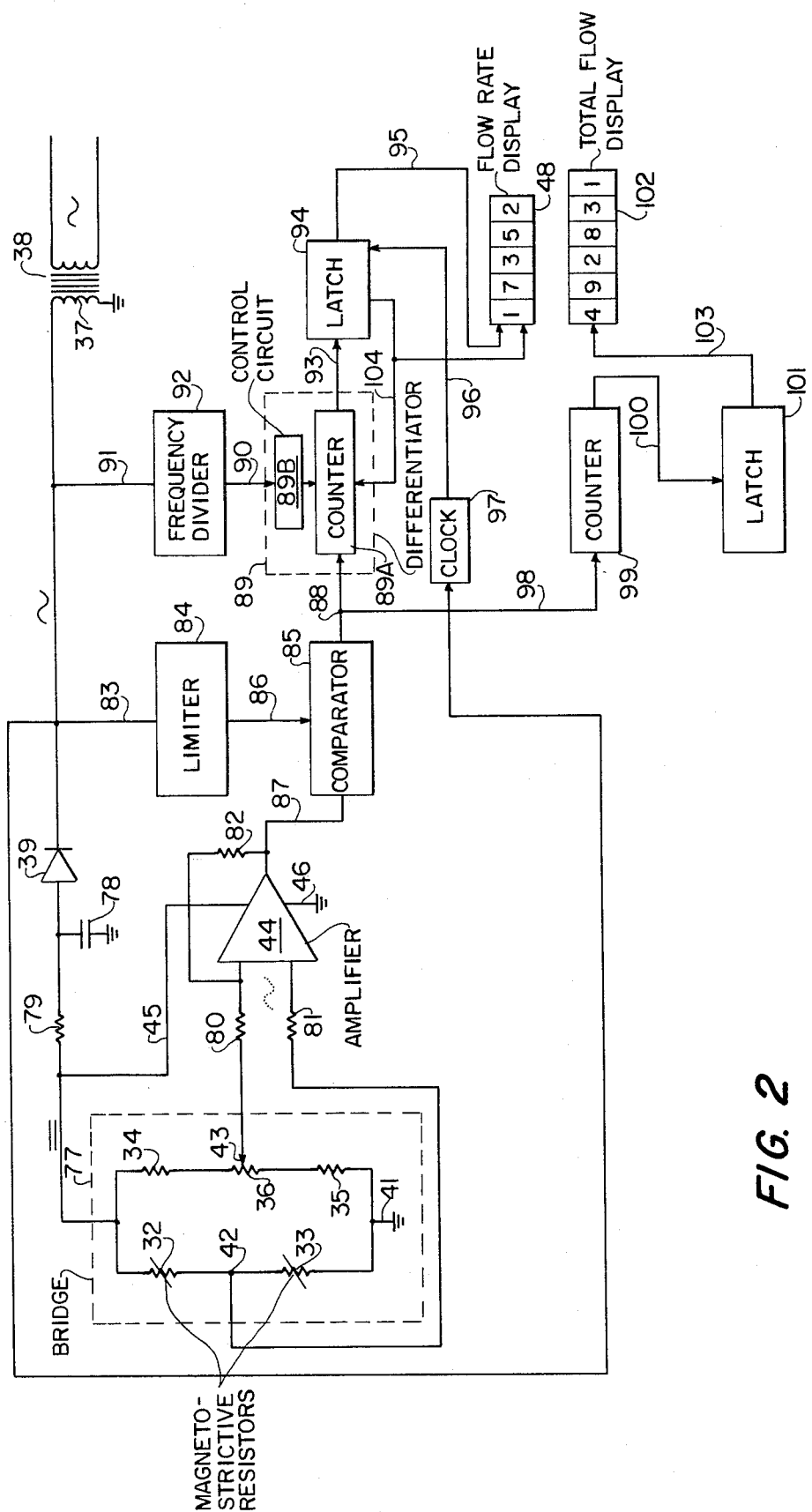
FIG. 2 shows an electronic wiring diagram for the arrangement according to FIG. 1.

In FIG. 2, the two magnet field sensitive resistors are indicated at 32 and 33. Preferably, they are of the type which provide a change of resistance, which is linearly variable with the field of intensity variation. This, however, is not of decisive importance, because the measurement, as will be further explained below, takes place by reading the pulse frequency, and not the pulse amplitude. The magnet field sensitive resistors 32 and 33 are connected in a bridge 77 to two further resistors 34 and 35. Between the terminals of the further resistors 34 and 35, and mutually connected thereto, is a control resistor 36 for pre-adjustment of the bridge arrangement to adapt it for the specific local circumstances such as pump pressure, type of valve and so on. The bridge coupling is fed by direct current obtained from the secondary winding 37 of a mains-connected transformer 38 as rectified by rectifier 39, preferably in the form of a zener-diode. For annulation of perhaps existing rest voltages of alternating type, the rectifier 39 is provided on its output side with a grounded L-type filter comprising condenser 78 and resistor 79. The feeder terminals of the bridge 77 are indicated at 40 and 41, respectively, and the pulse train, dependent upon the action of the bridge 77 and created by the magnetic pulses, is derived from the terminals 42 and 43. These electric pulses are brought via resistors 80 and 81 to an amplifier 44 which is by-passed by a resistor 82 and supplied with a DC voltage from the output of rectifier 39 by conductor 45.

The output voltage from the amplifier 44 is in the form of a pulse train having a frequency which is dependent upon the rotational speed of the magnet 26, FIG. 1, and therefore also upon the amount of medium moving through the valve during each unit of time. This frequency, therefore, is variable, as indicated by the dotted wave symbol in FIG. 2, and it is also different from the mains frequency.

However, the output voltage from the amplifier 44 may also be variable, and under normal circumstances is variable because the amplitude of a voltage created by a magnetic pulse generator 27 of the type using magnetostrictive resistors as described hereinabove will decrease with rising frequency and vice versa. For equalization of this difference in amplitude, the following steps advantageously are taken. Although they are not absolutely necessary, the steps do add to the accuracy of the instrument.

The mains voltage has not only a constant frequency but also a very close to constant amplitude. By means of a conduit 83, means voltage is brought to a conventional limiter 84 that produces a constant output voltage which is considerably lower than the mains voltage and corresponds in order of magnitude to the output voltage of the amplifier 44, or, preferably, even a little less. The output of limiter 84 is brought to a conventional comparator 85 by means of conduit 86. The output of amplifier 44 is connected to comparator 85 by conduit 87. In the comparator 85 the amplitude of the output from the limiter 84 is compared with the amplitude of the voltage pulse train from the amplifier 44, and the last mentioned voltage is corrected, with the consequence that the output signals from the comparator 85 will have an alternating voltage of a frequency determined by the rotational speed of the magnet 26 but with an amplitude determined by the limiter 84. These comparator signals are conducted, over the conduit 88, to a differentiator 89.

Differentiator 89 comprises a conventional counter 89A and a conventional control circuit 89B for enabling and disabling the operation of the counter. Control circuit 89B is connected to the output of a conventional frequency divider 92 by a conductor 90, and the frequency divider 92 is connected to the mains or input source by a conductor 91. The input source is now in practically all countries synchronized, usually to 50 periods or cycles per second, and this synchronization is extremely exact. As is conventional, frequency divider 92 comprises a counter, preferably a binary counter (not shown), which senses each positive half wave of the input source or mains frequency and counts a predetermined number of periods before producing an output.

The signal represented by the counted half waves can thus be frequency divided to obtain a frequency which is much lower than the input source frequency (50 cycles/sec.), e.g. one cycle per 30 seconds, while still maintaining proportional synchronization with the input source frequency, thereby resulting in a frequency signal 50×30 times more accurate than the input source frequency. Control circuit 89B is conventionally constructed such that the output of frequency divider 92 causes circuit 89B to alternately open and close and an enabling signal to be periodically produced thereby having a duration corresponding to the differential time period. In this way, a train of enabling pulses alternating with pulse intervals is produced, each of which has an extremely accurate length or duration determined by the accuracy with which the input source frequency is controlled.

During the time when counter 89A is enabled by an enabling pulse, the output pulses from comparator 85, which corresponds to the output pulses from bridge 77, are counted. Preferably counter 89A is a binary counter, but the binary-counter number of pulses is then converted into a decadic or decimal figure. For this purpose a conventional latch 94 advantageously is provided, as shown, which is connected to the output of counter 89A by conduits schematically indicated by conduit 93. As is conventional latch 94 advantageously includes coincidence circuits or the like (not shown) in order that the decimal value of the counter 89A output is produced at the output of latch 94, schematically indicated by conduit 95, at the end of every counting period. Also as is conventional, latch 94 is connected by conduit 96 so as to be controlled by the output of a conventional clock 97. Clock 97 is driven by the input source frequency by means of a conduit connected to the secondary winding 37 of transformer 38, as shown. As will be appreciated by those of ordinary skill in the art, information present at a data input of latch 94 is transferred to the output when the clock signal is high, and the output will follow the data input as long as the clock signal remains high. When the clock signal goes low, the information that was present at the data input at the time the transition occurred is retained at the output until the clock signal again goes high. In the present invention, the output of clock 97 advantageously is synchronously timed with the output of frequency divider 92 such that the clock input to latch 94 is low during the periods counter 89A is counting and goes high during the intervals between enabling pulses from frequency divider 92. Latch 94 and counter 89A are further conventionally interconnected, as is schematically indicated by conduit 104, such that counter 89A is reset to a zero count when the output of clock 97 goes high. Thus, as will be appreciated by those of ordinary skill in the art, the output of latch 94 remains constant during a counting period but changes during the intervals between counting to correspond to the final count reached during the preceding counting period. Further, since counter 89A is reset to zero following each counting, the final count converted and stored in latch 94 at any given time corresponds only to the count for a corresponding differential time period.

The output of latch 94 is connected, as is schematically shown by conduit, to a conventional indicating display 48. Advantageously, as shown, display 48 is connected to conduit 104 so as to be controlled by the output from clock 97. Specifically, display 48 is responsive to the output of latch 94 when the clock output is high, and is "locked" so as to display the same value while the clock output is low.

It should be remembered that in using any differentiation means the value of the differentiated magnitude is found during a short interval of time, usually called a "differential," which in the present case should mean counting during a period of time corresponding to said differential. This is the time interval determined by a high degree of accuracy by frequency dividing of the input source frequency. By this method two essential advantages are gained:

First, as mentioned above, the input source frequency is correct by an extremely high accuracy, which adds to increased accuracy in the final result.

Second, the differential time period is rather long; in practice for instance it is in the order of magnitude of about half a minute. This long differential time period causes an equalization of accidental variations in the flow, thereby obtaining a mean value of the flow during the differential time period.

The fact that the differential time period is not, as in the usual mathematical time derivative, infinitesimally short, will not cause any disadvantage, because the inertia of the moving medium is so great that its speed of movement will hardly change during the differential time period.

In order to measure the total flow of the controlled medium, a further counter 99 advantageously is provided which is connected by a conduit 98 in parallel with differentiator 89 to the output of comparator 85. The output from counter 99 is fed over a conduit 100 to a second binary to decimal converter 101, which, however, is not provided with any arrangement for zero-positioning, and, consequently, continuously counts the pulses and converts them into decimal system to be fed in this form to a second display 102 over a conduit 103.

Figure 3:
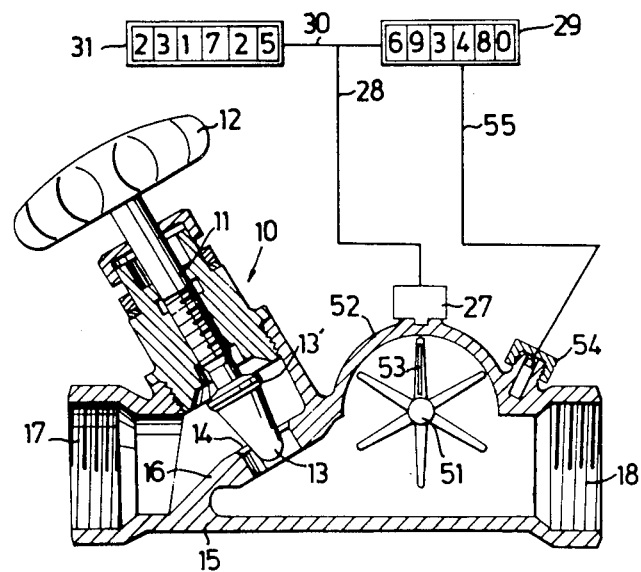
FIG. 3 shows another embodiment of the invention, adapted for measuring the flow of heat.

With reference to FIG. 3 there is shown a variation of the embodiment in FIG. 1, intended to indicate not the speed of flow but rather the speed of transfer heat, carried by the moving medium. In FIG. 3 such details which are also found in FIG. 1 have been indicated by the same reference numerals. However, it is obvious that there is nothing to prevent one from using the same system to indicate both the speed of movement of the medium, and also the speed of transfer of heat. The same way as one indicates the speed of movement of the medium by the instrument 29 in FIG. 1, and the total of the quantity by means of the pulse counting instrument 31, one could also in the embodiment of FIG. 3 indicate the total of the transferred amount of heat by means of a separate reading instrument. This, however, has not been shown in FIG. 3. The way of connecting it would be obvious to one skilled in the art.

The rotor in the arrangement shown in FIG. 3 is a little differently shaped than the rotor in the arrangement according to FIG. 1. The rotor in FIG. 3 comprises a shovel wheel 51, fitted in an extension 52, of the valve casing. One or more of the shovels in this shovel wheel 51 contains a magnet 53 molded into it, which will generate pulses in the magnetic pulse generator 27, which are then transferred along with further details, which will become evident from FIG. 4 through the conductor 28 to the instrument 29. There is also a temperature sensor 54 provided in some place of the valve casing 15, which measures a temperature representative of the temperature of the moving medium. This temperature sensor 54 may comprise one or more linearly acting thermistors connected to the comparator by means of conductor 55.

The electronics of the arrangement according to FIG. 3 will be evident from the block diagram in FIG. 4, as far as it is not already described in connection with FIG. 1.

Figure 4:
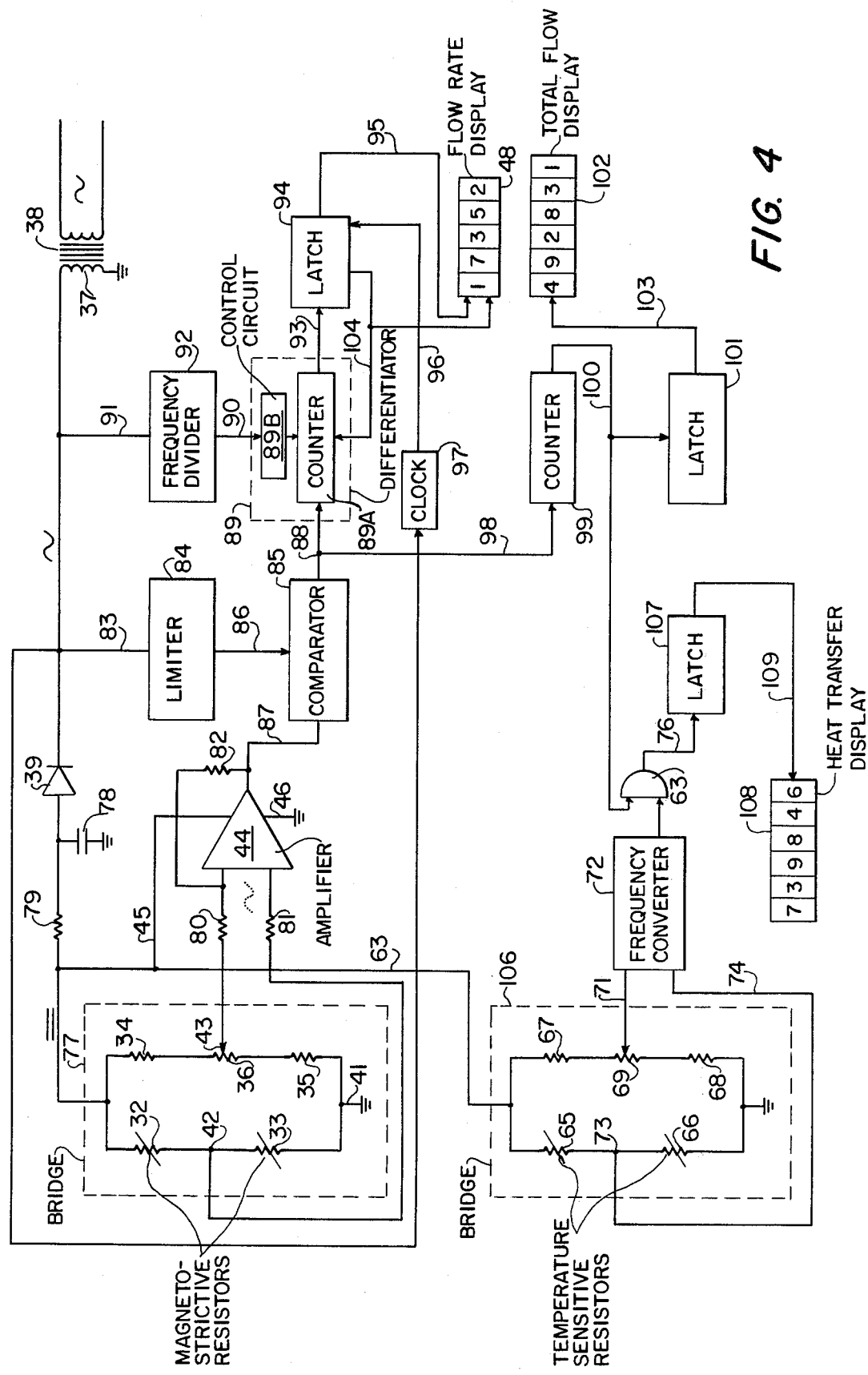
FIG. 4 shows, in block diagram form, the electronic wiring diagram for the arrangement of FIG. 3.

With reference to FIG. 4, the input source voltage is obtained in the same way as in the arrangement according to FIG. 2, which is by means of a transformer 38, having its low voltage secondary winding 37 of a suitable magnitude (e.g., 10 volts), and maintaining the frequency of 50 cycles per second under synchronized conditions.

The measurement of temperature, in this case, takes place by means of a second bridge 106, which is in practice built into the temperature sensor 54 of FIG. 3. The bridge is fed with DC voltage over conductor 63 and comprises two temperature sensitive resistors 65 and 66, preferably thermistors, and two fixed resistors 67 and 68 with an intermediate potentiometer resistor 69. From the slider 70 of the potentiometer resistor 69 a first conductor 71 runs to a conventional voltage to frequency converter 72, and from the connection point 73 between the temperature sensitive resistors 65 and 66 a second conductor 74 runs to another terminal of the same voltage to frequency converter 72. The output 75 of voltage to frequency converter 72 thus has a frequency dependent upon the measure of the temperature by sensor bridge 106. This output is combined in logical gate 63 with the output of counter 99, which is indicative of total flow therebetween and thereby indicating a measure of the total heat power delivered by the moving medium. This indication, therefore, may be used for debiting the inhabitant of a dwelling or the like, in which the heat power has been consumed. For this purpose, the indication is transferred over the conductor 76 to a latch 107, thereafter over a conductor 109 to a display 108, which is identical with the display contained in the instrument 31 of FIG. 3.

The instrument 31, FIG. 3, or the display 108, FIG. 4, thus will indicate the total amount of heat transferred through the valve to a space, for instance a flat, which is heated by said heat transporting medium.

As mentioned above, the invention should not be limited to the specific embodiments described in connection with the drawings, but rather different modifications may exist within the framework of the invention. Some examples of such modifications, while not intended to be all inclusive, are mentioned below:

It is not necessary to shape the valve proper and the measuring instrument inside of a valve casing made in one single piece. But, rather, one may also provide the valve within a first case and the measuring device with its rotor inside of a second case and connect the two parts with each other by screw connection or in any other suitable way. Under all circumstances, they should be provided in immediate connection to each other in mechanical respect.

It is also not necessary to build all of the electronic equipment described in the arrangements according to FIGS. 1 and 3 inside one single casing, but it may be divided up into a plurality of subsystems connected to each other. This will give the advantage that the indicator and/or certain of the parts contained in the electronic equipment may be placed at a distance from the valve proper, making remote control as well as remote reading more convenient. In this connection it is also possible to provide means for remote control of the valve in accordance with a remotely observed measuring result.

We claim:

1. In combination, a valve unit for a moving heat carrying medium in a feeder pipe of a heat radiator and electrical measuring means, supplied with voltage at a source frequency, for measuring the rate of flow of the moving medium, said valve unit being part of an integral unit comprising a length of conduit through which the moving medium flows, a propellor-like rotor disposed in the conduit and the valve unit itself, the valve unit being integrated with said conduit and serving in controlling the flow of the moving medium through the conduit, said rotor including a permanent magnet associated therewith, said measuring means including magnetic pulse generator means located exteriorly of said rotor for sensing the magnet field produced by said magent and for generating a train of electrical pulses in accordance with the rotation of said rotor, said measuring means further comprising counting means responsive to a control signal for counting the number of pulses produced during the rotation of the rotor during a selected differential time period related to the source frequency, a frequency divider means for dividing the source frequency so as to produce said control signal with a frequency which is substantially lower than the source frequency, and means for indicating the count reached by said counting means during said selected time period.

2. The combination of claim 1, in which said pulses are connected as a first input to multiplication means comprising a logic gate and a further signal related to the temperature of the moving medium is connected as a second input to said multiplication means.

3. The combination according to claim 1, in which said conduit comprises a connection bushing located downstream of a restriction formed between a valve body contained in the valve unit and a valve seat contained in the valve unit.

4. The combination according to claim 1, in which the rotor is formed by a body with screw shaped wings which rotate inside of the valve unit.

5. The combination according to claim 1, in which the rotor is formed by a shovel wheel provided inside of an extension of the valve casing, said shovel wheel extending into a part of the interior of the valve unit within which the medium is moving.

6. The combination according to claim 1, in which the permanent magnet is molded into at least one of the vanes of the rotor, said vane being fabricated from a nonmagnetic material.

7. The combination according to claim 1, in which the magnetic pulse generator means comprises at least one magnetic field sensitive resistor.

8. A valve according to claim 7, in which two magnetic field sensitive resistors are provided adjacent to each other in branches of a bridge coupling, and in which a plurality of fixed resistors are included in the bridge coupling in a branch in parallel to the one in which magnetic field sensitive resistors are connected.

* * * * *